(12) United States Patent
Maule et al.

(10) Patent No.: US 7,502,198 B2
(45) Date of Patent: Mar. 10, 2009

(54) TAPE DEPLOYMENT SYSTEMS AND METHODS OF DEPLOYING TAPE IN DIGITAL DATA TRANSFER APPARATUS

(75) Inventors: Hugo W Maule, Chepstow (GB); Stephen Bodiley, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 473 days.

(21) Appl. No.: 11/490,037

(22) Filed: Jul. 21, 2006

(65) Prior Publication Data
US 2007/0086110 A1 Apr. 19, 2007

(30) Foreign Application Priority Data
Oct. 15, 2005 (GB) .................................. 0521005.9

(51) Int. Cl.
*G11B 15/665* (2006.01)

(52) U.S. Cl. ...................................................... 360/85

(58) Field of Classification Search .................. 360/85, 360/76, 94; 242/336, 354
See application file for complete search history.

(56) References Cited

U.S. PATENT DOCUMENTS

| | | | | |
|---|---|---|---|---|
| 5,386,329 A * | 1/1995 | Ikegawa | ........................ | 360/94 |
| 5,992,781 A * | 11/1999 | Suzuki et al. | ................ | 242/336 |
| 6,671,122 B2 * | 12/2003 | Konishi et al. | ................. | 360/95 |
| 7,375,919 B2 * | 5/2008 | Takasawa et al. | .............. | 360/85 |
| 7,375,920 B2 * | 5/2008 | Annen et al. | .................... | 360/85 |
| 2002/0053620 A1 * | 5/2002 | Konishi et al. | ............... | 242/354 |
| 2004/0212918 A1 * | 10/2004 | Hirabayashi et al. | ........... | 360/85 |
| 2006/0023345 A1 * | 2/2006 | Maule | ........................... | 360/85 |
| 2006/0103968 A1 * | 5/2006 | Jurneke | ......................... | 360/76 |

FOREIGN PATENT DOCUMENTS

| | | | |
|---|---|---|---|
| EP | 0944059 A1 | 9/1999 | |
| GB | 2413684 A | 11/2005 | |

* cited by examiner

*Primary Examiner*—Tianjie Chen

(57) ABSTRACT

A tape deployment system for a digital data transfer apparatus includes a tape guide movable from a non-deployed position to a plurality of deployed positions and a cam arrangement for determining the deployed position to which the tape guide moves.

20 Claims, 3 Drawing Sheets

TAPE DEPLOYMENT SYSTEMS AND METHODS OF DEPLOYING TAPE IN DIGITAL DATA TRANSFER APPARATUS

RELATED APPLICATIONS

The present application is based on, and claims priority from, British Application Number 0521005.9, filed Oct. 15, 2005, the disclosure of which is hereby incorporated by reference herein in its entirety.

BACKGROUND TO THE INVENTION

Magnetic tape is commonly used for storage of digital data. The magnetic tape is spooled on at least one reel in a cartridge that is insertable into a digital data transfer apparatus in which data can be written onto the tape and/or data can be read from the tape. Such data transfer apparatus, which may be referred to as a tape drive, typically includes one or more tape heads for one or both of reading and/or writing data from or to the tape head.

One format for data storage in a helical scan tape drive is Digital Data Storage (DDS). Various versions of DDS exist, but each version uses the same width tape in Digital Audio (DAT) cartridges, including DAT72 and DDS4. The tape width is approximately 4 mm. There is a demand for more and more data storage capacity. This has, to some extent, been met by improved reading and writing techniques that have allowed increased amounts of data to be stored, without changing the tape length or width. Additionally, the tape length has increased by making the tape thinner so that more tape can be packed into a cartridge. However, this has a practical limit. Ultimately, despite the improvement provided by the measures mentioned above, the storage capacity of a given size of tape has a limit.

One solution to the problem of data storage capacity is to increase the width of the tape. Of course, a greater width provides more storage area. However, since, conventionally, the cartridge loading devices and tape guide assemblies of tape drives are designed to interact with a particular size of cartridge/tape, if a tape drive is designed to use a wider tape (and consequently a larger size cartridge housing the tape), the end user is left with the problem that legacy format tape cartridges would not be usable with the tape drive and so it would be necessary to maintain more than one tape drive, or transfer existing stored data to the wider tape.

The Applicant has proposed tape drives designed to accept different width tapes so that the end user may be provided with a tape drive that can be used with narrower legacy format tapes and newer, wider, tapes. One problem that arises with such tape drives is that, where the tape drive utilises a rotary scanning system to read/write data from/to the tape, different wrap angles are required for different tape widths.

A rotary scanning system typically comprises a rotary scanning head (also known as a helical scan head). The rotary scanning head is usually in the form of a drum that has one or more head elements positioned on its cylindrical surface for performing read and/or write operations. During a loading process of a tape cartridge holding tape for use by the tape drive, a portion of the tape is deployed, or drawn from, the cartridge and wrapped around a portion of the cylindrical surface of the drum so that it can be read from or written to by the tape head. In use, the tape is moved longitudinally past the drum whilst the drum rotates about its axis of rotation. The drum typically rotates much faster than the speed of movement of the tape.

Data is placed on the tape in tracks that extend diagonally across the tape, typically at an angle of approximately 6° to the lengthways direction, or longitudinal axis, of the tape. The angle of the tracks is determined mainly by the tilt in the axis of the rotating drum relative to the orientation of the tape. The precise angle of the tracks is also determined by the relative speed of the movement of the tape and the rotational speed of the drum. However, due to practical limitations on the speed of the tape and the rotational speed of the drum, the effect of the variations of the tape and drum speeds on the track angle is small. Therefore, in order to extend the recorded track across most of the width of the tape, the wrap angle must be increased for the wider tape. This can be achieved by providing two tape guide assemblies together with respective tracks and drive mechanisms for the tape guide assemblies. One tape guide assembly is dedicated to the narrow tape and the other is dedicated to the wider tape. The tape guide assemblies draw the respective tapes from their cartridges to respective deployed positions that provide the required wrap angles

BRIEF DESCRIPTION OF THE DRAWINGS

In order that the invention may be well understood, embodiments thereof, which are given by way of example only, will now be described with reference to the drawings, in which.

DETAILED DESCRIPTION

Figure 1:
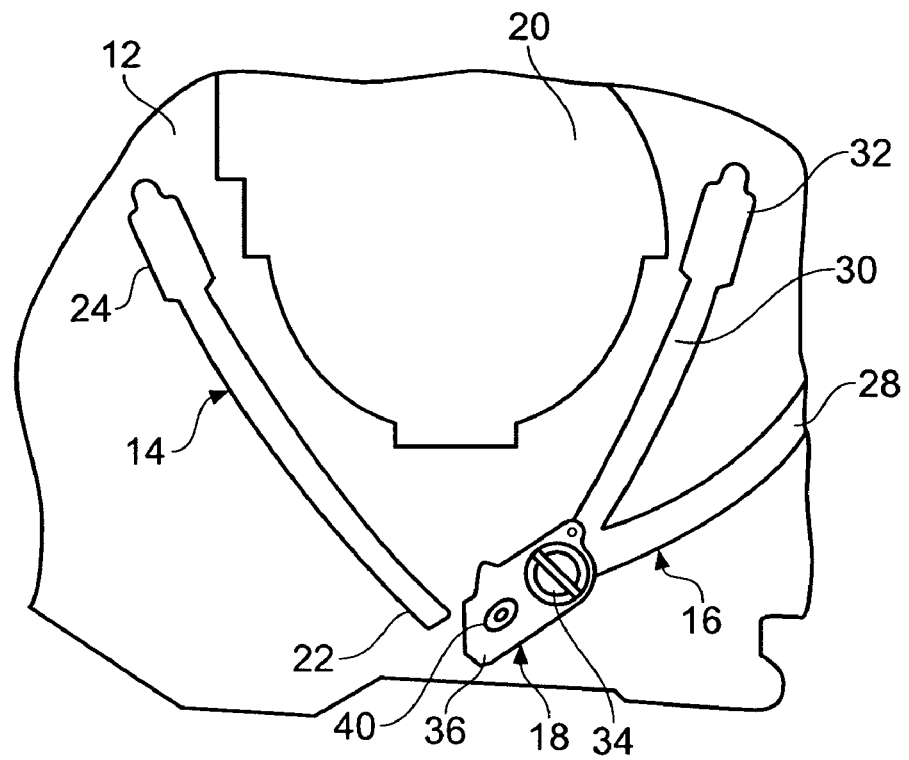
FIG. 1 is a plan view illustrating a tape deployment system.
Figure 2:
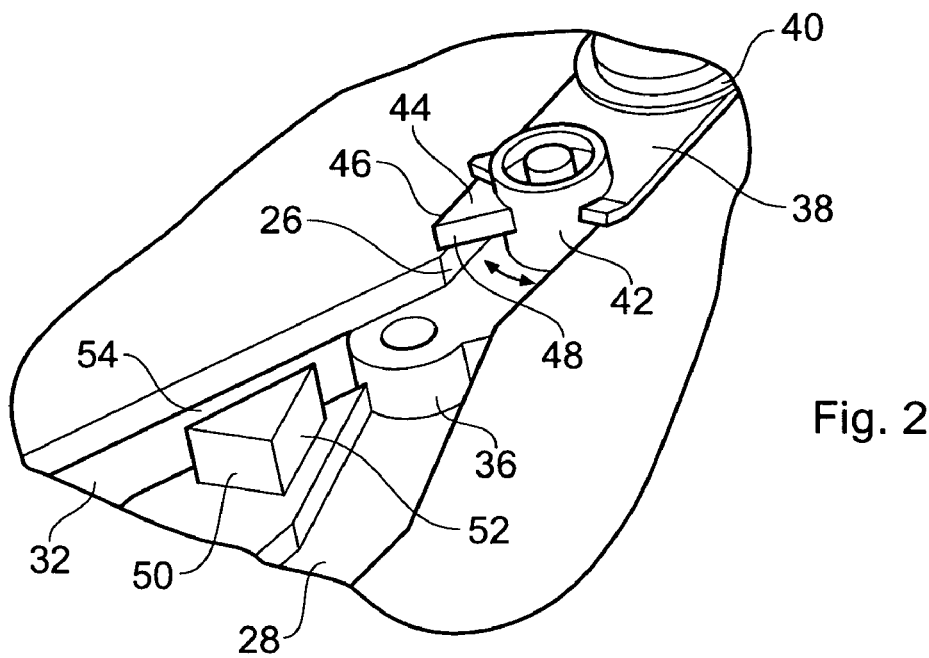
FIG. 2 is a perspective view of a portion of the underside of the tape deployment system of FIG. 1.
Figure 3:
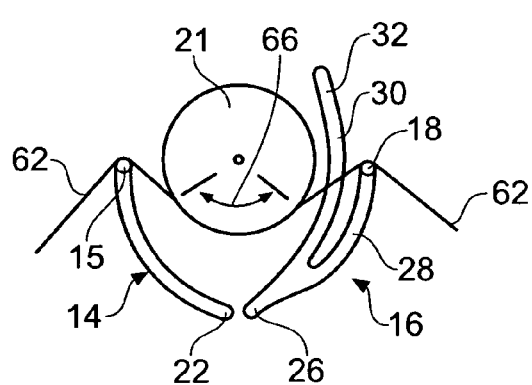
FIG. 3 is a view similar to FIG. 1 showing the tape deployment system in one use condition.

Referring to FIGS. 1 to 4, a tape deployment system for a digital data transfer apparatus comprises a plate, or chassis, member 12, defining two tracks 14, 16. The tracks 14, 16 are slots cut through the plate 12. The track 14 is for a tape guide 15 (FIG. 3). The track 16 is for a tape guide 18. The tracks 14, 16 extend around a cutout 20 in the plate 12 which, in use, accommodates a rotary scanning drum 21 (FIG. 3) of a rotary scanning system of the digital data transfer apparatus.

The track 14 has an inner end 22, which defines a non-deployed, position of the tape guide 15 and an outer end 24, which defines a deployed, position of the tape guide. In this context, inner means the end of the track 14 disposed furthest from the rotary drum. The tape guide 15 would be positioned at, or adjacent, the inner end of the track during the processes of loading a tape cartridge into, or removing a tape cartridge from, the tape drive.

Figure 4:
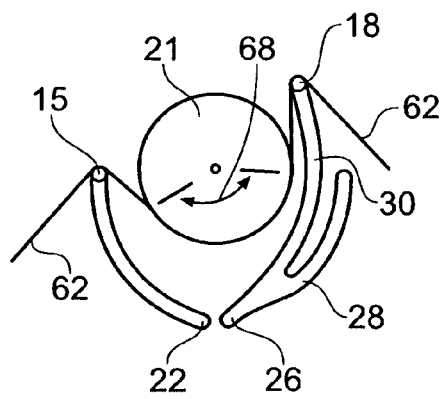
FIG. 4 is a view similar to FIG. 3 showing the tape deployment system in a second use condition.

The track 16 has a first portion 26 (FIG. 2), that in FIG. 1 is hidden by the tape guide 18. The tape guide 18 is shown positioned in the first portion 26 of the track 16, the inner end of which defines a non-deployed, position of the tape guide 18. At the outer end of the first portion 26, the track 16 splits to define a first branch 28 and a second branch 30. The respective outer ends of the first and second branches 28, 30 define a pair deployed, positions of the tape guide 18. In FIG. 1, only the outer end 32 of the branch 30 is shown. The outer end of the first branch 28 is shown in FIGS. 3 and 4.

The tape guide 18 comprises a post 34 mounted on a carriage plate 36. The carriage plate 36 rests on the upper (as viewed in FIG. 1) surface of the plate 12. A keeper plate 38 (FIG. 2) is secured to the carriage plate 38 by a rivet 40, or any other suitable means, so that the plate 12 is sandwiched between the carriage plate and keeper plate and the carriage plate is constrained to move along the track 16.

The post 34 typically comprises a cylindrical member having upper and lower flanges (not shown), but may be a plain cylindrical post. As described in more detail below with reference to FIG. 5, the post 18 may be provided with a lower flange for guiding the lower edge of a tape together with centre and upper flanges positioned to guide the upper edges of two different widths of tape.

The post 34 extends through the carriage plate 36 and is connected to a rotary keeper 42. The rotary keeper 42 is provided with a first cam device 44 which has a first cam face 46 and a second cam face 48.

Referring to FIG. 2, a second cam device 50 is shown fixed to the underside of the plate 12. The second cam device 50 comprises a triangular block that defines a cam face 52 arranged to cooperate with the first cam face 46 and a cam face 54 arranged to cooperate with the second cam face 48.

With the setting of the cam device 44 that is shown in FIG. 2, when the tape guide 18 is moved along the first portion 26 of the track 16 towards the branches 28, 30, the second cam face 48 will engage the cam face 54 of the second cam device 50 causing the tape guide 18 to move into the second branch 32 of the track 16. If, instead, the first cam device 44 were rotated anticlockwise (as viewed in FIG. 2) to a suitable setting, the first cam face 46 would engage the cam face 52 causing the tape guide 18 to be guided into and along the first branch 28 of the track 16. Thus, by rotating the first cam device 44 between predetermined positions, or settings, it is possible to cause the tape guide 18 to be guided into a predetermined one of the branches 28, 30. Suitable actuating means for moving the first cam device 44 between its predetermined positions will be described below with reference to FIGS. 5 and 6.

Use of the tape deployment system of FIGS. 1 and 2 in a digital data transfer apparatus will now be described in more detail with reference to FIGS. 3 and 4. Referring first to FIG. 3, the tape deployment system is shown with the tape guide 15 in the track 14 and the tape guide 18 in track 16 both in deployed positions in which they guide a magnetic tape 62 around a portion of the periphery of the rotary scanning drum 21 of a rotary scanning system. In this case, the first cam device 44 will have been set so that when the tape guide 18 was moved from the first portion 26 of the track 16 to its deployed position, the first cam face 46 will have engaged the cam face 52 of the second cam device 50 so that the tape guide 18 was guided into the first branch 28 of the track 16. As can be seen in FIGS. 3 and 4, the first branch 28 does not extend around the rotary scanning drum 2 as far as the second branch 30. The result is that the tape 62 is wrapped around the rotary scanning drum over a relatively small angle 66.

Referring now to FIG. 4, prior to deploying the tape, the first cam device 44 will have been set so that when the tape guide 18 was moved from the first portion 26 of the track 16 to its deployed position, the second cam face 48 will have engaged the cam face 54 of the second cam device 50 so that the tape guide was guided into the second branch 32 to its deployed position. This produces a larger wrap angle 68.

By setting the position of the first cam device 44 according to the width of the tape 62, the tape guide 18 can be deployed to the position shown in FIG. 3, which is suitable for a relatively narrow tape (for example a 4 mm tape) or the position shown in FIG. 4, which is suitable for a relatively wider tape (for example 8 mm tape). Thus, the tape deployment system operates to move the tape guide 18 to positions that produce a wrap angle 66, 68 suitable for the width of tape inserted into the digital data transfer apparatus.

A setting, or selector, mechanism 100 for setting the first cam device 44 and an example of a tape guide with a different post will now be described with reference to FIGS. 5 and 6.

Figure 5:
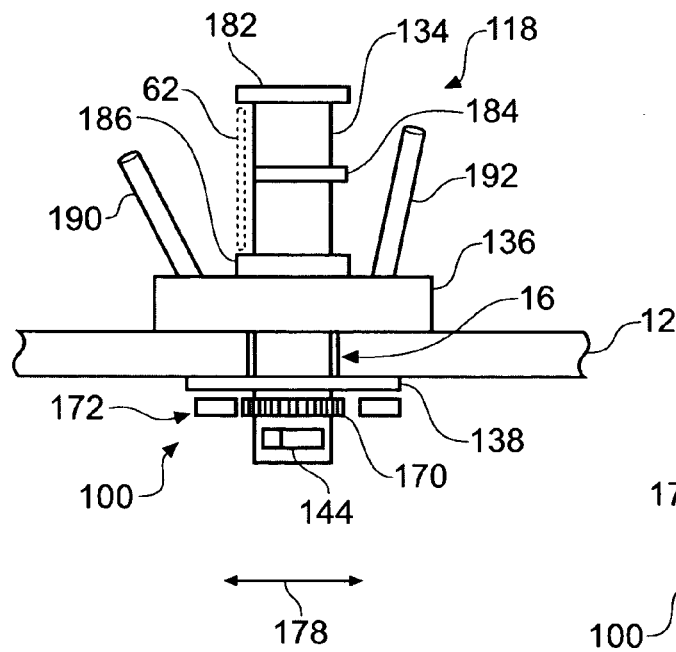
FIG. 5 is a side elevation showing a different tape guide for the tape deployment system and a setting mechanism for the tape deployment system.
Figure 6:
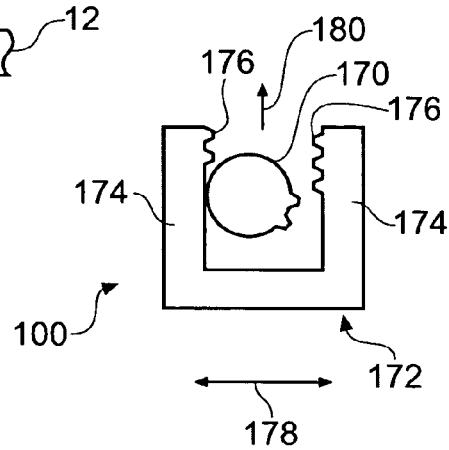
FIG. 6 is a schematic plan view of the setting mechanism.

Referring to FIG. 5, a tape guide 118 comprises a post 134 mounted on a carriage plate 136. The carriage plate 136 is seated on the upper surface of a plate or chassis member 12. A keeper plate 138 is disposed below the plate 12 and secured to the carriage plate 136. The post 134 passes through the carriage plate 136, the track 16 defined by the plate 12 and the keeper plate 138 and is fixed to the plates 136, 138. A spur gear, or pinion, 170 is provided on the post 134 below the keeper plate 138 and the first cam device 144 is provided on the post 134 below the pinion.

The setting mechanism 100 comprises the pinion 170 and a selector fork 172. As best seen in FIG. 6, the selector fork 172 is generally U-shaped and has opposed arms 174 sandwiching the pinion 170. Each arm 174 is provided with a linear gear or rack 176. For ease of illustration, just a small number of gear teeth are shown on the arms 174 and the pinion 170. In practice, the pinion 170 will have teeth all around its circumference and the racks 176 will extend for a significant part, or all, of the length of the arms 174. In a preferred embodiment, the racks 176 are of sufficient length to turn the post through 90° to set the first cam device 144 to the two positions that will cause the tape guide 118 to be guided into the branches 28, 30 (i.e. the post has a neutral position from which it is rotated 90° clockwise by one rack and 90° anticlockwise by the other rack).

An actuator mechanism (not shown) is provided for moving the selector fork 172 back and forth in a plane perpendicular to the axis of rotation of the post 134. This movement is represented by the arrow 178. By virtue of this movement, one of the racks 176 can be brought into contact with the pinion 170. According to which of the racks 170 engages the pinion, when the tape guide 118, and so the pinion 170, is moved relative to the rack, as indicated by the arrow 180 in FIG. 6, the pinion will rotate clockwise or anticlockwise, bringing the first cam device 144 to a desired setting for engaging the second cam device 50 and causing the tape guide 118 to be guided into a predetermined branch of the track 16.

The selector fork 172 is actuated according to the size of magnetic tape cartridge loaded into the digital data transfer apparatus in which the tape deployment system is fitted. The selector fork 172 could be actuated by a linkage mechanism that is actuated by a cam provided on the tape cartridge. In this case, cam portions provided on the cartridges would be arranged to engage the linkage system differently so that a predetermined size of cartridge, or cartridges, would cause a predetermined one of the racks 176 to engage the pinion 170. Alternatively, switches or sensors could be provided to detect the size of cartridge inserted into the digital data transfer apparatus and provide signals to an electrical actuator, such as a motor, coupled to the selector fork 172 and arranged to cause the desired rack 176 to engage the pinion 170 according to the tape cartridge size. Suitable actuators for the selector fork 172 will be readily envisaged by those skilled in the art and, so, will not be described in greater detail herein. Yet another alternative would be to have one or more sensors arranged to sense the tape width of a tape loaded into the digital data transfer apparatus directly from the tape and provide signals to an electrical actuator.

A feature of the post 134 is that it has three flanges 182, 184, 186. The upper flange 182 is positioned with respect to the lower flange 186 such that the distance between them corresponds to the width of a relatively wider tape. In use, the upper and lower flanges 182, 186 will engage the upper and lower edges of a wider tape 62. The centre flange 184 is positioned such that the distance between it and the lower flange 186 corresponds to the width of a relatively narrower tape.

The centre flange 184 extends around just a part of the circumference of the post 134, whereas the upper and lower flanges 182, 186 extend around the full circumference. The arrangement of the centre flange 184 is such that when the first cam device 144 is set to guide the tape guide 118 into the branch 28 (FIG. 4), the centre flange will be orientated such that it engages the upper edge of a relatively narrow tape (not shown) magnetic tape so that the tape is guided between the centre flange and lower flange 182. When the first cam device 144 is set to guide the tape guide 118 into the branch 30 (FIG. 3), the centre flange 184 is simultaneously rotated away from the tape guiding position so that the tape 62 can engage the post 134 between the upper and lower flanges 182, 186 as illustrated in FIG. 5.

As shown in FIG. 5, the tape guide 118 may optionally be provided with two inclined, plain cylindrical, guide posts 190, 192. The guide posts 190, 192 are arranged to cooperate with the guide post 134 in guiding the tape 62. Specifically, one of the guide posts 190, 192 is arranged to cooperate with the guide post 134 in guiding a relatively narrower tape and the other is arranged for guiding a relatively wider tape. When the first cam device 144 is rotated to bring it to the setting required for the size of tape cartridge loaded into the tape drive, the tape guide 118 as a whole is rotated so that the centre flange 184 and the guide posts 190, 192 are oriented according to the width of the tape in the cartridge.

An example of a mechanism 200 for moving the tape guides 18, 118 between their non-deployed and deployed positions will now be described with reference to FIGS. 7 and 8. For the sake of clarity, in the description of the mechanism 200, reference will be made only to the tape guide 18.

The mechanism 200 comprises a linkage comprising a first bar 202 and a second bar 204. The first bar 202 has an end pivotally mounted at point 205. The opposite end of the first bar 202 is pivotally connected to one end of the second bar 204. The other end of the second bar 204 is pivotally connected to the tape guide 18. It is to be understood that the "bars" may be of any desired shape and configuration and the term is not to be taken as limiting. For example, one or both of the bars 202, 204 may be flat plate-like members including portions adapted to serve functions other than moving the tape guides 18.

The first and second bars 202, 204 are arranged such that when the tape guide 18 is in its non-deployed position at the inner end of the first portion 26 of the track 16, the end of the first bar connected to the second bar is at point 206. In use, in moving the tape guide 18 to its respective deployed positions at the ends of the branches 28, 30, the end of the first bar 202 connected to the second bar 204 moves along an arcuate path 208 from the start point 206 to an end point 210.

Figure 7:
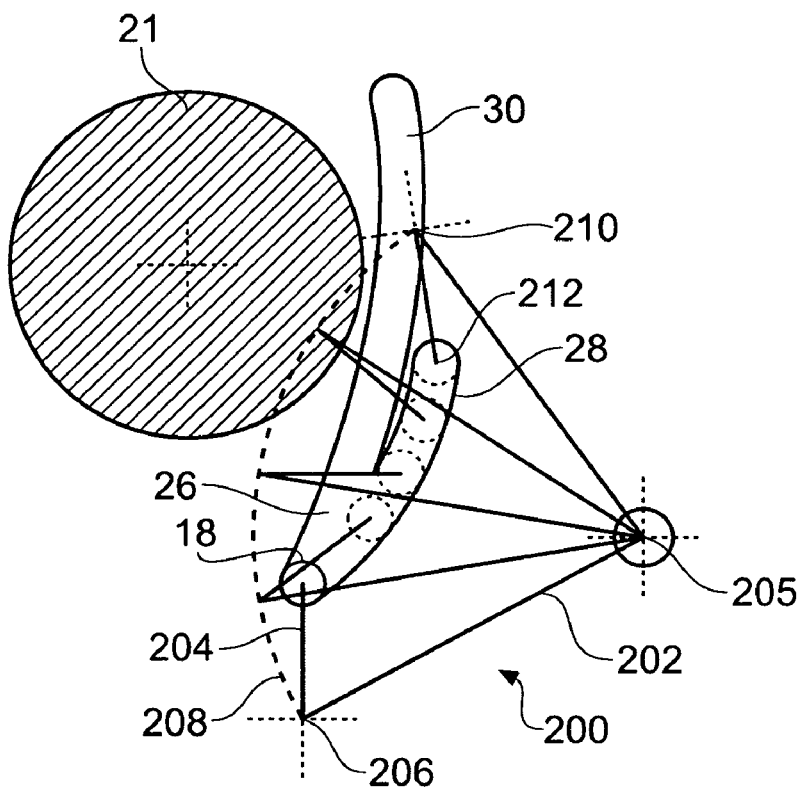
FIG. 7 is a schematic representation of a mechanism for moving a tape guide of the tape deployment system showing movement of the tape guide along a first branch portion of a track.

Referring to FIG. 7, when the first cam device 44 is set to guide the tape guide 18 into the branch 28, as the first bar 202 is rotated to move its end connected to the second bar between the points 206, 210, the second bar 204 pivots clockwise (as viewed in the drawing) to first push and then pull the tape guide along the branch 28 until the tape guide reaches its deployed position at the end of the branch. In this condition of the mechanism 200, the position of the pivotal connection between the second bar 204 and the tape guide 18 is indicated by reference numeral 212.

Figure 8:
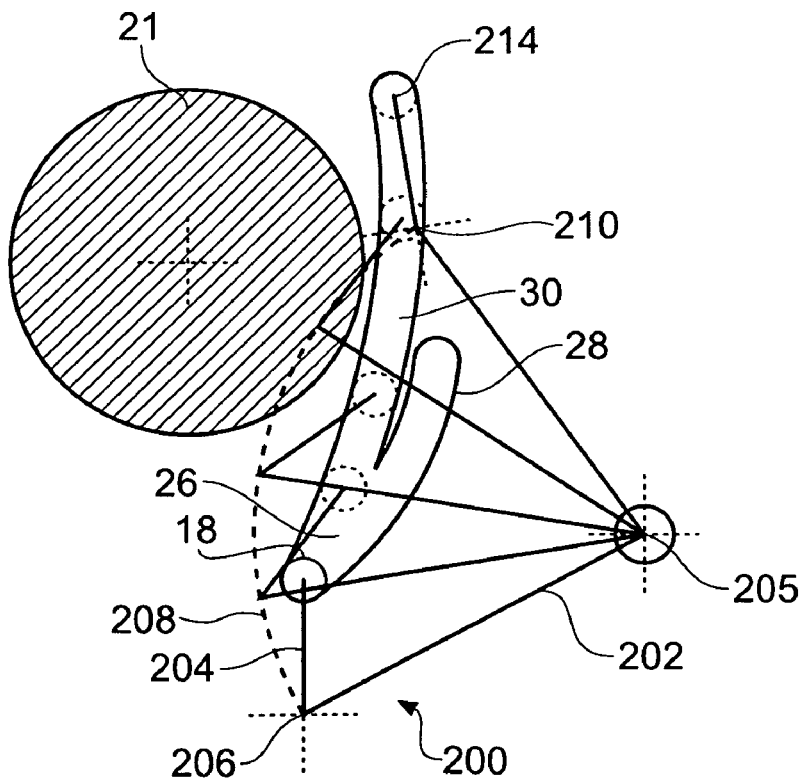
FIG. 8 is a schematic representation of the mechanism showing movement of the tape guide along a second branch portion of the track.

Referring to FIG. 8, when the first cam device 44 is set to guide the tape guide 18 into the branch 30, as the end of the first bar 202 connected to the second bar rotates between the points 206, 210, the second bar 204 pushes the tape guide 18 to its deployed position at the end of the branch 30. In this condition of the mechanism 200, the position of the pivotable connection between the second bar 204 and the tape guide 18 is indicated by reference numeral 214. The mechanism is designed such that the point 210 is equidistant between positions 212 and 214. In this embodiment, the points 210, 212, 214 are on a straight line. By means of this arrangement, a simple two-bar linkage mechanism is able to move the tape guide 18 to its respective deployed positions at the ends of the branches 28, 30 using the same rotational movement of the first bar 202 between the points 206, 210.

Rotation of the first bar 202 may be caused by any suitable drive device, of which many will be familiar to the skilled person. Typically, rotation will be caused by a DC motor coupled with the first bar 202. By use of suitable coupling arrangements, the DC motor may be used to actuate other parts of the tape drive. In one example, the motor may be connected to a rotary linkage mechanism that is coupled to the cartridge loading mechanism of the digital data transfer apparatus. That rotary linkage mechanism, which may include a bell crank, can be connected to the first bar 202 by a slider bar (not shown) to provide the necessary rotation of the first bar 202. The skilled person will be able to envisage many suitable drive arrangements for the mechanism 200 and, so, no detailed description of such arrangements is provided here.

It will be understood that by suitable selection of the dimensions of the track 16 and positioning of the linkage relative to the track, a single two-bar linkage can move the tape guide 18 from its non-deployed to its deployed positions by a single movement of the first bar 202, requiring only the same input movement from the actuator. This provides for a simple drive control arrangement and a low parts count, which in turn provides for space saving and a product that can be produced more economically.

In the illustrated embodiments, a single tape guide 18, 118 is guided into a desired branch of the track according to the width of tape of a cartridge inserted into the tape drive. In an alternative embodiment, two separate tape guides (not shown) are provided for the track 16 and are arranged such that they are disposed one behind the other in the first portion 26 of the track. One of the tape guides is provided with a fixed first cam device arranged to cooperate with the second cam device provided on the chassis member to cause the tape guide to move into the first branch 28 and the other of the tape guides is provided with a fixed first cam device arranged to cooperate with the second cam device to cause the tape guide to move into the second branch 30. In use, the tape guides would be moved along the track together, their paths diverging where the track branches, at which point the tape guides would continue to move along the respective branches to their deployed positions.

In the illustrated embodiments provided with two separate tape guides having fixed first cam devices as described in the last paragraph, advantageously, a mechanism similar to the mechanism 200 would be used. In that case, the first bar 202 would have two second bars pivotally connected to the end point 206. The two second bars would typically be of different length and the finish point 210 of the arcuate path 206 positioned such that it is spaced from the ends of the branches 28, 30 according to the respective lengths of the second bars.

In the embodiments, only one track 16 is branched. However, if desired both of the tracks 14 and 16 could be branched and provided with tape guides similar to, or identical to, the tape guides 18, 118.

In the illustrated embodiments, the first cam device 44 is adjustable between predetermined settings and the second cam device is fixed. It will be appreciated that the first cam device could be fixed and the second cam device made adjustable.

It will be appreciated that the illustrated embodiments provide the advantage of having a guide post that can be directed to any one of a plurality of predetermined deployed positions relative to the rotary scanning drum and placed in a corresponding predetermined orientation relative to the drum by operation of the first and second cam devices, thus reducing the number of guide posts required as compared with a tape deployment system having dedicated guide posts for each size of tape a digital data transfer apparatus is designed to handle. The inclined posts typically associated with the guide post could either be fixed posts positioned ahead of the movement path of the tape, or movable posts movable from behind the tape by a separate movement mechanism. The embodiment illustrated in FIG. 5 provides the additional advantage that the inclined posts are orientated and moved by the same mechanisms as the guide post, further reducing the number of parts required.

What is claimed is:

1. A tape deployment system for deploying tape from multiple size cartridges around a rotary scanning drum of a rotary scanning system of a digital data transfer apparatus, each size cartridge of said multiple size tape cartridges holding a magnetic tape having a width and the width of the tape held by each size of said multiple size tape cartridges being different to the width of tape held by the other sized cartridges of said multiple size tape cartridges, said tape deployment system comprising:
   a track having a first portion and a plurality of branch portions branching from said first portion;
   a tape guide movable along said track and provided with a first cam device; and
   a second cam device arranged to cooperate with said first cam device such that when, in use, said tape guide is moved from said first portion of the track towards said plurality of branches, the tape guide is guided into a predetermined said branch.

2. A tape deployment system as claimed in claim 1, wherein one of said first and second cam devices is adjustable between a plurality of predetermined settings, said first and second cam devices cooperating such that when, in use, said tape guide is moved towards said plurality of branches, the tape guide is guided into a predetermined said branch according to the setting of the adjustable one of said first and second cam devices.

3. A tape deployment system as claimed in claim 2, wherein said first cam device is the adjustable one of said first and second cam devices and said second cam device is fixed.

4. A tape deployment system as claimed in claim 3, wherein said tape guide comprises a tape guiding post having a first flange, a second flange and a third flange disposed between said first and second flanges, said third flange extending partially about said tape guiding post and being arranged such that when said first cam device is adjusted to a first said predetermined setting, said third flange is positioned in a non-tape-guiding orientation such that a major face of a relatively wider said magnetic tape can make a substantially continuous contact with said tape guiding post along a line extending substantially from said first flange to said second flange and when said first cam device is adjusted to a second said predetermined setting, said third flange is positioned in a tape guiding orientation such that a major face of a relatively narrower tape can make a substantially continuous contact with said tape guiding post along a line extending substantially from said first flange to said third flange.

5. A tape deployment system as claimed in claim 2, further comprising an actuator for adjusting said adjustable one of said first and second cam devices according to the width of tape of a said multiple size cartridge, said actuator being responsive to respective camming portions of said multiple size cartridges.

6. A tape deployment system as claimed in claim 2, further comprising an actuator for adjusting said adjustable one of said first and second cam devices according to the width of tape of a said multiple size cartridge and at least one electrical detector for detecting a feature of a said multiple size cartridge, said actuator being responsive to signals provided by said at least one electrical detector.

7. A tape deployment system as claimed in claim 2, further comprising an actuator for adjusting said adjustable one of said first and second cam devices according to the width of tape of a said multiple size cartridge, said actuator comprising first gearing engageable with second gearing carried by said tape guide such that relative movement of said first and second gearing moves the first cam device between said predetermined settings.

8. A tape deployment system as claimed in claim 7, wherein said first gearing comprises two racks provided on a support, said support being movable laterally of said racks for bringing a selected one of said racks into engagement with said pinion, whereby, in use, said movement of the tape guide towards said plurality of branches causes rotation of said pinion that rotates said first cam device to a said predetermined setting.

9. A tape deployment system as claimed in claim 1, further comprising a linkage mechanism operable to move said tape guide along said track, said linkage mechanism comprising a first link member, a second link member and a pivot connection between said first and second members, said second link member being pivotally connected to said tape guide at a pivot position spaced apart from said pivot connection.

10. A tape deployment system as claimed in claim 9, wherein said linkage mechanism is operable to move said tape guide from said first portion of the track along said branches to the respective deployed positions by pivotting movement of said first link member that causes said pivot connection to move from a first position to a second position, which second position is equidistant from said deployed positions of the tape guide.

11. A tape deployment system as claimed in claim 10, wherein said second position and said deployed positions lie on an imaginary straight line disposed in a plane perpendicular to the pivot axis of said pivot connection.

12. A digital data transfer apparatus comprising a tape deployment system as claimed in claim 1.

13. A tape deployment system for deploying tape in a digital data transfer apparatus, said tape deployment system comprising tape guide means movable from a non-deployed position to a plurality of deployed positions and cam means for determining the deployed position to which the tape guide means moves.

14. A tape deployment system as claimed in claim 13, further comprising track means for said tape guide means, said tape guide means being movable along said track means from said non-deployed position to each said deployed position, said deployed positions being defined by respective branches of said track means and said cam means being adjustable between respective settings for determining the branch into which the tape guide means moves.

15. A tape deployment system as claimed in claim 14, further comprising setting means for setting said cam means according to an indication of a tape width of a tape which, in use, is loaded into a said digital data transfer apparatus.

16. A tape deployment system as claimed in claim 13, further comprising a two bar link means connected to said tape guide means such that pivoting movement of said two bar link means can move said tape guide means from said non-deployed position to each said deployed position.

17. A method of guiding tape in a digital data transfer apparatus comprising a rotary scanning drum, said method comprising adjusting a cam device between a plurality of predetermined settings to cause a tape guide to be guided into a desired branch of a track along which the tape guide is movable from a non-deployed position to respective deployed positions defined by the branches whereby an angle of wrap of the tape about the rotary scanning drum is determined by the deployed position of the branch into which the tape guide is guided.

18. A method as claimed in claim 17, comprising determining the width of a said tape loaded into the digital data transfer apparatus and adjusting the cam device according to the determined width.

19. A method as claimed in claim 18, wherein said width of the tape is determined by sensing a feature of a cartridge in which the tape is housed.

20. A method as claimed in claim 18, wherein said tape guide comprises a post provided with at least three projecting tape edge guides and adjusting the cam device orientates said post such that two of the tape edge guides spaced apart a distance corresponding substantially to said width of the tape are orientated such that when in the deployed position determined by the adjustment of the cam device, said two of tape edge guides can guide the edges of the tape.

* * * * *